United States Patent
Hamilton-Gahart et al.

(10) Patent No.: US 6,665,497 B1
(45) Date of Patent: Dec. 16, 2003

(54) MODULAR TRANSCEIVER AND ACCESSORY SYSTEM FOR USE IN AN OPTICAL NETWORK

(75) Inventors: Jeffrey Hamilton-Gahart, Santa Rosa, CA (US); Alexandr Kizeev, Nepean (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/899,882

(22) Filed: Jul. 5, 2001

(51) Int. Cl.[7] .......................... H04B 10/00; H04B 10/12
(52) U.S. Cl. ..................... 398/135; 385/24; 385/88; 398/140; 398/136; 398/141; 398/182; 398/214; 398/139
(58) Field of Search .................. 385/88–94, 139; 359/180, 188, 189, 195, 152–154, 157, 159–164, 168, 173; 398/135, 139, 140, 141, 182, 200, 202, 214

(56) References Cited

U.S. PATENT DOCUMENTS

| | | | | |
|---|---|---|---|---|
| 5,757,998 A | * | 5/1998 | Thatcher et al. | 385/75 |
| 5,767,999 A | * | 6/1998 | Kayner | 359/163 |
| 5,879,173 A | * | 3/1999 | Poplawski et al. | 438/138 |
| 5,901,263 A | * | 5/1999 | Gaio et al. | 385/92 |
| 5,966,487 A | * | 10/1999 | Gilliland et al. | 385/92 |
| 6,058,119 A | | 5/2000 | Engbersen et al. | 370/466 |
| 6,188,495 B1 | * | 2/2001 | Inoue et al. | 359/152 |
| 6,236,499 B1 | | 5/2001 | Berg et al. | 359/341 |
| 6,240,087 B1 | | 5/2001 | Cummings et al. | 370/360 |
| 6,285,673 B1 | | 9/2001 | Blackburn et al. | 370/360 |
| 6,334,716 B1 | * | 1/2002 | Ojima et al. | 385/89 |
| 6,350,063 B1 | * | 2/2002 | Gilliland et al. | 385/88 |
| 6,402,393 B1 | * | 6/2002 | Grimes et al. | 385/89 |
| 2002/0025125 A1 | * | 2/2002 | Williams | 385/92 |

* cited by examiner

*Primary Examiner*—Brian Healy
*Assistant Examiner*—Kevin S Wood
(74) *Attorney, Agent, or Firm*—Ritter, Lang & Kaplan LLP (57) ABSTRACT

A modularized network component system that includes a transceiver module and a separate accessory module, and enables the transmissions range of the transceiver module to be augmented by the accessory module, is disclosed. According to one aspect of the present invention, an optical network includes a fiber, a first device, and a second device. The first and second devices are coupled to the fiber such that the second device is in communication with the first device through the fiber. The second device includes a first modular subsystem that is arranged both to transmit data and to receive data through the fiber. The first modular subsystem is substantially physically decoupleable from the second device and from the fiber such that the first modular subsystem may be readily replaced within the second device by another modular subsystem.

24 Claims, 8 Drawing Sheets

MODULAR TRANSCEIVER AND ACCESSORY SYSTEM FOR USE IN AN OPTICAL NETWORK

CROSS REFERENCE TO RELATED APPLICATION

The present invention is related to U.S. patent application Ser. No. 09/628,848, filed Jul. 31, 2000, which is incorporated herein by reference in its entirety.

BACKGROUND OF THE INVENTION

1. Field of Invention

The present invention relates generally to optical network systems. More particularly, the present invention relates to modularizing functionality associated with transmitting and receiving data within optical network systems.

2. Description of the Related Art

The demand for data communication services is growing at an explosive rate. Much of the increased demand is due, at least in part, to the fact that more residential and business computer users are becoming connected to the Internet. Furthermore, the types of traffic being carried by the Internet are shifting from lower bandwidth applications towards high bandwidth applications which include voice traffic and video traffic.

To accommodate the growth and demand for Internet services, service providers are rapidly installing network switching devices, such as routers, and upgrading physical media throughout their networks. For user access, dial-in lines are being replaced by digital subscriber loop (DSL), cable modem, and broadband fixed wireless. Increasingly, the network backbone exploits optical fiber physical media. Fiber is also being deployed further toward the network edge so that, for example, data over cable networks are being transformed into hybrid fiber cable (HFC) networks. However, even with these advances in data networking technologies and the high level of investment by service providers, demand for network bandwidth continues to outpace supply.

In an effort to increase the bandwidth associated with data networking technologies, and, further, to provide improved data transmissions capabilities, the length of fibers in a network is being increased. Specifically, the length of fibers and, hence, the transmissions capabilities of optical transmissions systems, is being increased. Optical fiber transmissions systems are often connected as specified by a synchronous optical network (SONET) standard, a synchronous digital hierarchy (SDH) standard, or an optical transport network (OTN) standard. SONET establishes Optical Carrier (OC) levels, SDH establishes Synchronous Transport Module (STM) levels, and OTN establishes Optical Channel Transport Unit (OTU) levels, or bit rates at which data streams may be transmitted across an optical network. At present, the OC-48 level for SONET equipment and the STM-16 level for SDH equipment, which are associated with a 2.5 Gigabit per second (Gbps) bit rate, and the OTU-1 level which is associated-with 2.7 Gbps bit rate, are widespread, although the OC-192 and STM-64 levels for SONET and SDH equipment, respectively, which are associated with a 10.0 Gbps bit rate, and the OTU-2 level for OTN equipment, which is associated with a 10.7 Gbps bit rate, are becoming more prevalent. SONET arid SDH equipment, which may operate at a still higher speed, e.g., bit rate of 40.0 Gbps, as specified by the OC-768 and STM-256 levels, and OTN equipment, which may operate at bit rate of 43.0 Gbps, are under development.

Increasing the transmissions range over which data is transferred generally increases chromatic dispersion (CD) and polarization mode dispersion (PMD) of the fiber. As will be appreciated by those skilled in the art, CD generally occurs when each spectral component of modulated light travels at different speeds over a fiber, or a wire, thereby causing intersymbol interference (ISI). ISI caused by CD typically increases with the length of the fiber. Another effect that causes ISI is PMD. When an optical pulse excites both orthogonal polarization components within the fiber, the optical pulse becomes broader at the fiber output since the two polarization components disperse along the fiber because of their different group velocities. To characterize a PMD effect, differential group delay (DGD) is often used. As the length of a fiber increases, the DGD between two orthogonal polarization states increases, resulting the ISI.

When a system is to be upgraded from one level to another, as for example from the OC-48 level to the OC-192 level, or the range of a system is to be increased, the components and the circuitry associated with the system must often be replaced or altered. Components often must be added to compensate for increased effects of CD and PMD. Generally, the effects of CD and PMD increase as the distance over which a signal must travel increases, as previously mentioned. The effects of CD and PMD within a system also increase significantly as an associated bit rate increases, because CD and PMD effects are constant for defined fiber length, while the bit time interval decreases. Hence, changes to a system associated with a network may require substantial changes in circuitry and components used in a transceiver system which transmits and receives information on the network.

In addition to changes in components and circuitry associated with compensating for CD and PMD, network devices, e.g., line cards which include components and circuitry associated with transceivers and receivers are often of different sizes for different standards, different levels, and for different transmissions ranges, and the wiring associated with the cards often also has to be changed when an upgrade in a system is to be made. System software associated with different standards is also generally not compatible between different standards. Further, thermal requirements may also be different for different standards and levels, e.g., more heat sinks may be needed for higher bit rates or longer transmissions ranges. As a result, upgrading a system to a higher transmissions range, for example, is often a time-consuming, expensive process.

Since the demand for faster bit rates over longer ranges is ever increasing, upgrading SONET, SDH, or OTN equipment to support faster bit rates is occurring more frequently. As such, what is desired is a method and an apparatus for enabling upgrades in SONET, SDH, or OTN equipment to be made efficiently.

SUMMARY OF THE INVENTION

The present invention relates to a modularized network component system which includes a transceiver module and a separate accessory module, and enables the transmissions range of the transceiver module to be augmented, i.e., expanded, by the accessory module. According to one aspect of the present invention, an optical network includes a first device, and a second device. The first and second devices are coupled to a fiber such that the second device is in communication with the first device through the fiber. The second device includes a first modular subsystem that is arranged both to transmit data and to receive data through the fiber, as well as to process optical data and electrical data. The first modular subsystem is substantially physically decoupleable from the second device and from the fiber such that the first modular subsystem may be readily replaced within the second device by another modular subsystem.

In one embodiment, the first modular subsystem includes a transceiver module that supports a short reach transmissions range. In such an embodiment, the first modular subsystem may also include an accessory module that augments the transmissions range supported by the transceiver module. The accessory module is arranged to cooperate with the transceiver module to improve the transmissions range of the transceiver module.

The use of a transceiver module that may be decoupled from a line card or similar device enables the performance of the line card to be readily changed, e.g., improved. Further, the use of accessory modules to expand upon the transmissions range of the transceiver module enables functionality to effectively be added to the transceiver module without requiring that the transceiver module be modified. In general, the use of modules which are substantially independent of a host device enables the modules to be upgraded without requiring that the host device be substantially modified. Hence, using a transceiver module and an accessory module provides a relatively low cost, effective method for upgrading the performance of a network device on a network, e.g., from an OC-48, an STM-16 and an OTU-1 level to an OC-192, an STM-64, and an OTU-2 level, respectively, or from the OC-192 level, the STM-64 level, and the OTU-2 level to an OC-768 level, an STM-256 level, and an OTU-3 level, respectively.

In accordance with still another aspect of the present invention, a device that is suitable for use as a part of a network that includes at least one transmission fiber has a body and a first module. The body includes a first connector part that is configured to interface with a second connector part that is a part of the first module. The first module is decoupleable from the body, and includes a receiver and a transmitter. A first connection of the first module may be coupled with the transmission fiber. When the first module is coupled to the body through the first connector part and the second connector part, the first module is arranged to communicate, e.g., exchange information, with the body.

In one embodiment, the first module is arranged to support a first transmissions range, and the device further includes a second module that is arranged to augment the first transmissions range, and is decoupleable from the body. The second module may interface with the first module through the body. In such an embodiment, the second module is arranged to augment the first transmissions range to support a second transmissions range that is substantially larger than the first transmissions range.

According to yet another aspect of the present invention, a device that is suitable for use on a network includes a body, a transceiver module, and an accessory module. The transceiver module is arranged to be removably coupled to the body, and to transmit and to receive data through the network. The transceiver module also transmits and receives data through the body, while supporting relatively short range transmissions. The accessory module is arranged to be removably coupled to the body, and also transmits and receives data through both the network and the transceiver module. The accessory module cooperates with the transceiver module to support intermediate or long range transmissions.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

In order to facilitate upgradability in optical networks such as a synchronous optical network (SONET), a synchronous digital hierarchy (SDH), and an optical transport network (OTN), transceivers which transmit and receive signals across fibers may be modularized. By modularizing transceivers, the performance of products and devices which use the transceivers, such as optical transport platforms and routers, may be altered by readily swapping transceivers into and out of the products and devices. Hence, transceivers with different or new capabilities may be readily implemented as a part of a product or a device.

In general, the range over which a transmission, e.g., an optical transmission, is to be made effectively dictates the complexity associated with the transceivers and associated components. For example, the complexity of a transceiver, and associated components, which supports substantially only a relatively short transmissions range is often less than that of a transceiver, and associated components, which supports a longer transmissions range.

Modularizing transceivers and associated components allows the performance of a "base line" transceiver module to be augmented by associated components, e.g., accessory modules, as needed. By way of example, a base line OC-768 40 Gigabit per second (Gbps) transceiver module may be used, without an accessory module, when substantially only short range transmissions, or transmissions that essentially do not exceed a 2 kilometer (km) distance, are needed. For transmissions ranges which are in excess of approximately 2 km, as for example an intermediate transmissions range which may include an upper limit of approximately 40 km or a long transmissions range, which may include an upper limit of approximately 80 km, an accessory module may be used to effectively "boost" the performance of a base line transceiver. That is, an accessory module may be used in conjunction with a transceiver module in order to provide a higher range of transmissions.

The use of a modularized transceiver system, which, in one embodiment, includes a transceiver module and an accessory module that may be decoupled from one another, enables customers to both readily tailor the transceiver system for specific needs and readily upgrade functionality of the system. Accessory modules may be chosen and added to a system to expand a transmissions range associated with a transceiver. When improved transceivers and/or accessory modules become available, the modularity of a transceiver system generally allows for older transceivers and/or accessory modules to be swapped, e.g., hot swapped, for the improved transceivers and/or accessory modules without requiring an overhaul of the overall system which uses the transceivers and/or accessory modules, e.g., a router or an optical transport platform.

Figure 1:
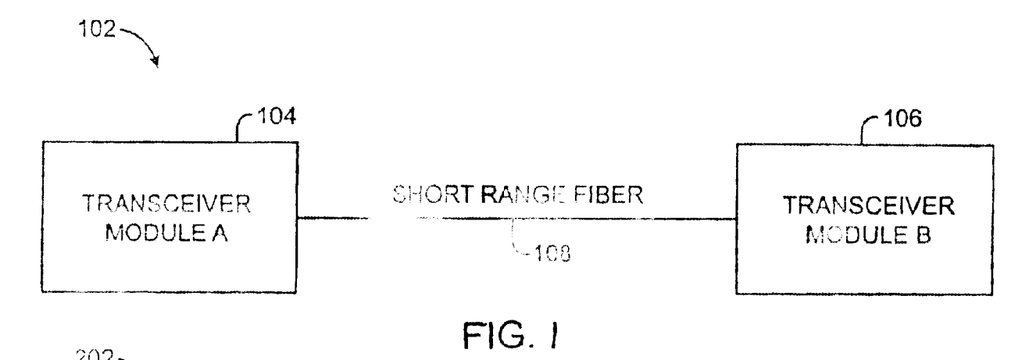
FIG. 1 is a diagrammatic representation of a short range transmission system in accordance with an embodiment of the present invention.

A modular transceiver may be used in some situations without an accessory module. Specifically, a modular transceiver may be used for relatively short range communications without an accessory module. FIG. 1 is a diagrammatic representation of a short range transmission system in accordance with an embodiment of the present invention. A short range transmission system 102 includes a transceiver module A 104 and a transceiver module B 106, which are in communication across a fiber 108. In the described embodiment, fiber 108 has an associated short transmission range. As will be understood by those skilled in the art, each of transceiver module A 104 and transceiver module B 106 may be implemented for use with respect to a line card, e.g., a line card which may be used as a part of an optical transport platform. Suitable optical transport platforms are the ONS 15454, the WRBU 15900, and the HFR, which are each available from Cisco Systems, Inc., of San Jose, Calif. Such optical transport platforms may use, for example, line cards to provide optical bandwidth and optical services.

Typically, a transceiver module such as transceiver module A 104 includes substantially only basic components that enable bi-directional communications to occur on a short range basis. For example, transceiver module A 104 may include components needed to transmit and receive data, as will be discussed below with respect to FIG. 4. By not including components necessary to support more than short range bi-directional communications, the cost associated with transceiver modules, as well as the complexity of transceiver modules, may be kept at a relatively low level substantially without compromising thermal performance or optical performance. Hence, users who desire only short range transmission capabilities generally will not be required to pay the costs associated with enabling intermediate range or long range transmission capabilities.

When either intermediate range or long range transmission capabilities are needed, an accessory module may be used in conjunction with a transceiver module, e.g., transceiver module A 104, in order to effectively enable the transceiver module to support intermediate range or long range transmissions. That is, components associated with providing a transceiver module with either intermediate range or long range transmission capabilities are typically encompassed in a physically separate accessory module that may be coupled, e.g., communicably coupled, to the transceiver module. By placing components which support intermediate range or long range transmissions in a module that is physically separate from an associated transceiver module, the cost associated with the transceiver module itself may be substantially minimized. Further, the use of a separate accessory module effectively enables the transceiver module to be expandable.

Figure 2:
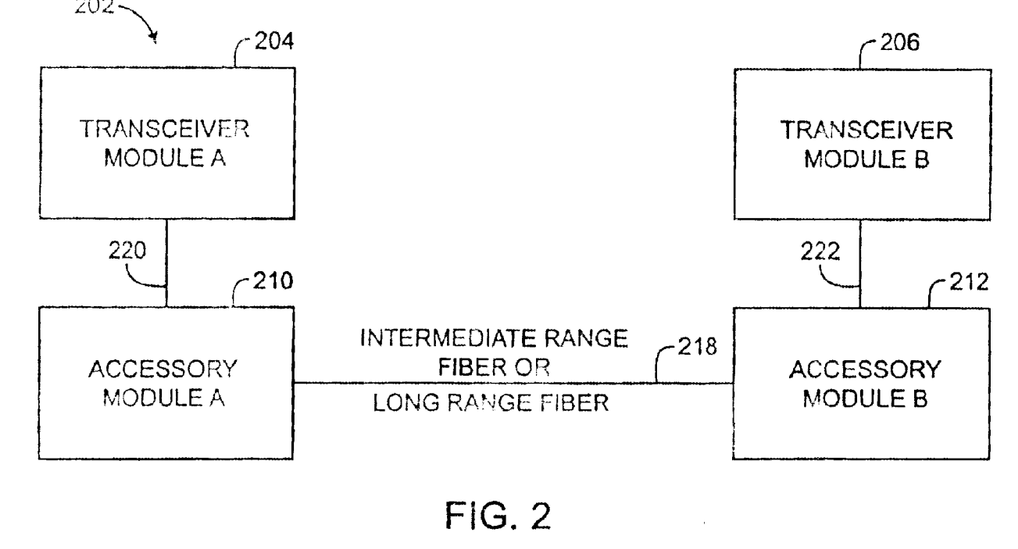
FIG. 2 is a diagrammatic representation of a transmission system which includes accessory modules in accordance with an embodiment of the present invention.

With reference to FIG. 2, a transmission system which includes accessory modules will be described in accordance with an embodiment of the present invention. A transmission system 202 includes a transceiver module A 204, a transceiver module B 206, an accessory module A 210, and an accessory module B 212. Transceiver module A 204, which is communicably coupled to accessory module A 210, is arranged to support short range transmissions. Accessory module A 210 may be an optical accessory module, and is arranged to effectively provide transceiver module A 204 with either intermediate range transmissions capabilities or long range transmissions capabilities. In one embodiment, accessory module A 210 may be suitable for providing both intermediate range transmissions capabilities and long range transmissions capabilities with good thermal and optical performance. Like transceiver module A 204, transceiver module B 206 is arranged to support short range transmissions. Accessory module B 212 effectively provides transceiver module B 206 with intermediate range or long range transmissions capabilities.

As shown, accessory module A 210 is in communication with accessory module B 212 across a fiber 218, e.g., a fiber-optic cable. Fiber 218, in the described embodiment, may have an intermediate range length, or may have a long reach length. Transceiver module A 204 is typically in communication with accessory module A 210, while transceiver module B 206 is typically in communication with accessory module B 212, through substantially any suitable medium. Suitable mediums include, but are not limited to, any combination of cables, traces on a PC board, fibers, and wires.

Modules such as transceiver module A 204 and accessory module A 210 may generally be arranged to be used in a variety of different manners. By way of example, modules may be arranged to be used as components of a line card in an optical network device. For instance, modules may be included on line cards in routers. Alternatively, modules may be arranged to be used as "stand alone" modules, or modules which are not components of a line card, e.g., modules may be used as stand alone components of a router.

Figure 3A:
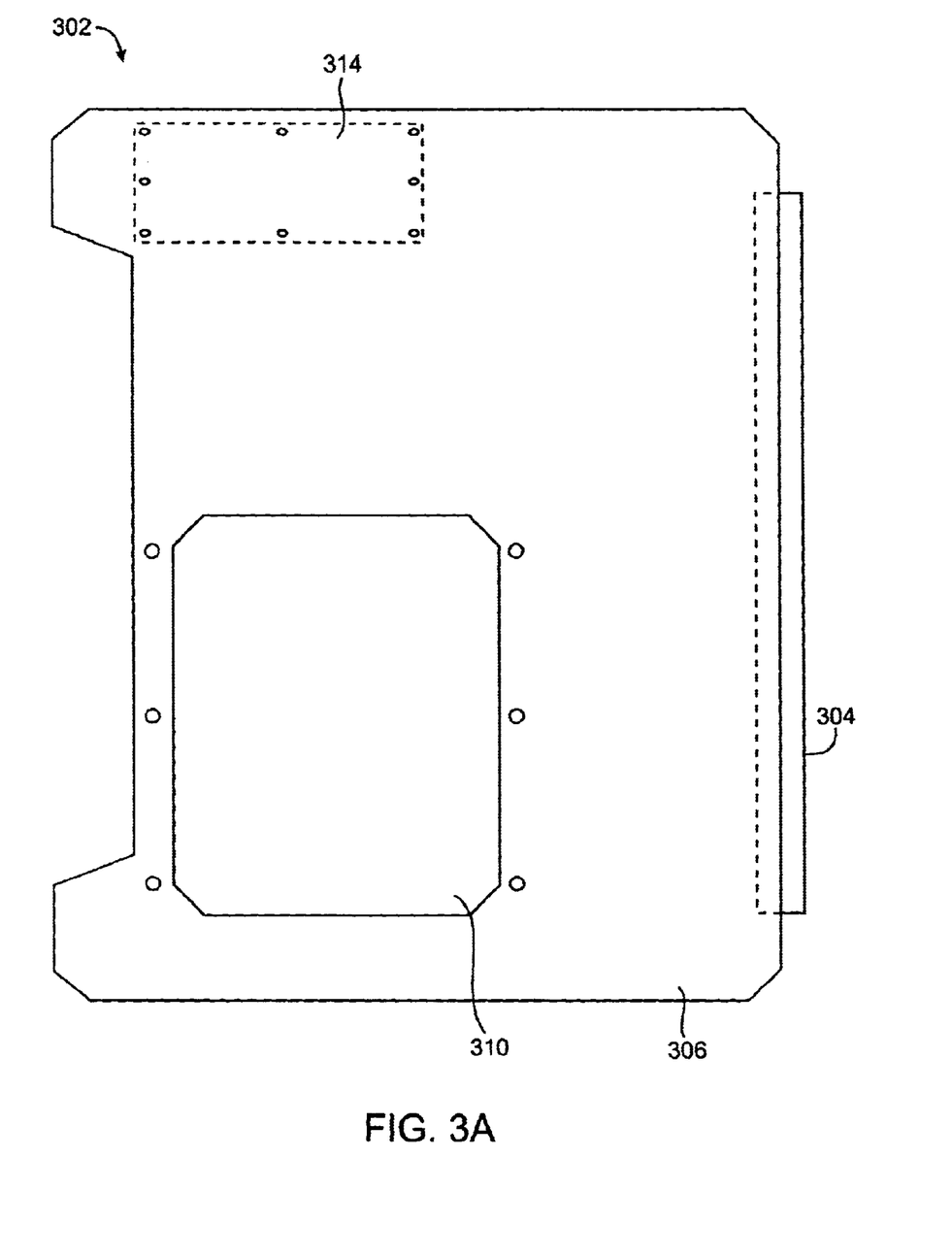
FIG. 3A is a diagrammatic representation of a line card with spaces designated for a transceiver module and an accessory module in accordance with an embodiment of the present invention.

When a module is used as a part of a line card, the module is generally either arranged to be physically coupled to one side of the line card or arranged to be fit through the line card such that the module may be secured on the line card. FIG. 3A is a diagrammatic representation of a line card with spaces designated for a transceiver module and an accessory module in accordance with an embodiment of the present invention. A line card 302 is typically a PC board 306 that is arranged to be coupled to another PC board or device through a connector 304. Although board 306 generally includes various components, e.g., connectors and integrated circuits, as well as traces, such components and traces have not been shown in FIG. 3A for ease of illustration.

Figure 6A:
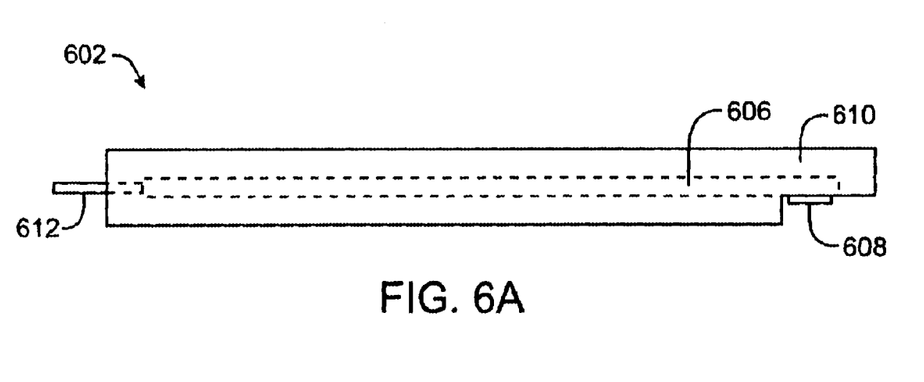
FIG. 6A is a diagrammatic cross-sectional representation of a first transceiver module in accordance with an embodiment of the present invention.
Figure 6B:
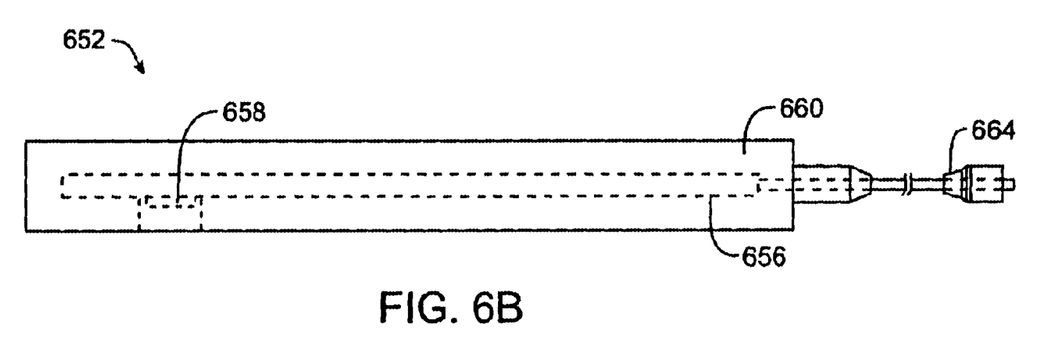
FIG. 6B is a diagrammatic cross-sectional representation of a second transceiver module in accordance with an embodiment of the present invention.

In one embodiment, board 306 includes an opening 310 that is sized to accommodate a transceiver module. The transceiver module (not shown), which may include an external heat sink, as will be discussed below with respect to FIGS. 6A and 6B, is arranged to be positioned through board 306 and screwed or otherwise physically secured into place. It should be appreciated that the transceiver module generally includes a connector or a similar structure for use in electrically coupling the transceiver module to board 306. An accessory module (not shown) is arranged to be positioned over an area 314. Like the transceiver module, the accessory module may be physically coupled to board 306 using screws or the like, and electrically coupled to board 306 through the use of a connector or a similar structure. To uncouple a transceiver module or an accessory module from board 306, the transceiver module or the accessory module may be both physically decoupled, e.g., unscrewed, and electrical uncoupled.

Figure 3B:
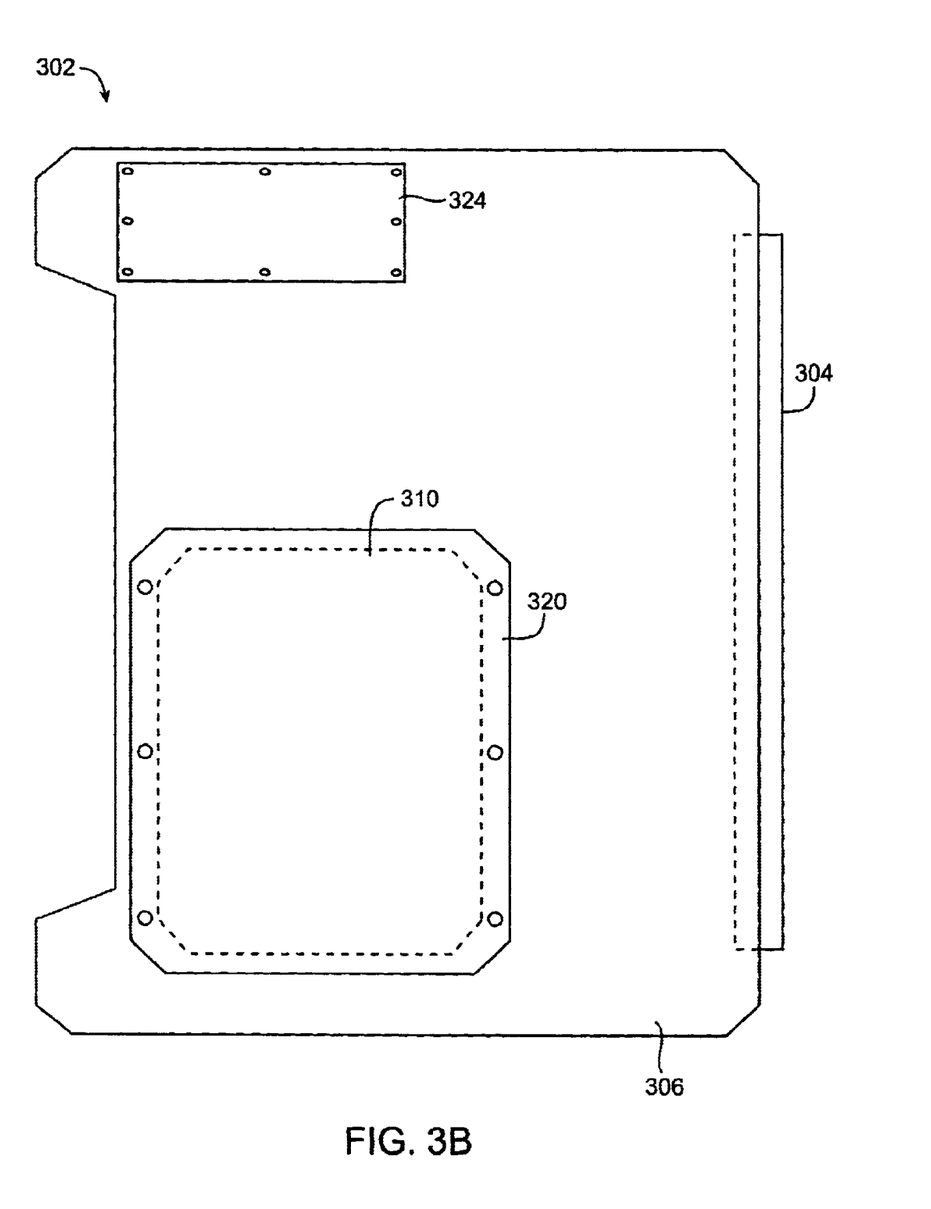
FIG. 3B is a diagrammatic representation of a line card, i.e., line card 302 of FIG. 3A, after a transceiver module and an accessory module have been added in accordance with an embodiment of the present invention.

FIG. 3B is a diagrammatic representation of line card 302 after a transceiver module and an accessory module have been added in accordance with an embodiment of the present invention. A transceiver module 320 is arranged to be positioned at least partially within opening 310, while an accessory module 324 is arranged to be positioned over area 314. Once both transceiver module 320 and accessory module 324 are coupled to board 306, transceiver module 320 and accessory module 324 may then communicate, as for example via a parallel data bus.

As described above, a transceiver module typically includes substantially only the components and circuitry needed to support a relatively short range transmissions of information. A transceiver module may generally be compliant with SONET standards, SDH standards, or OTN standards. Such standards may include, but are not limited to, OC-48, STM-16, OTU-1, OC-192, STM-64, OTU-2, OC-768, STM-256, and OTU-3 levels. Although transceiver and accessory modules may be designed to meet substantially any suitable SONET, SDH, and OTH standard, for purposes of discussion, one specific embodiment of the present invention relates to a OTN G.709 standard.

A transceiver module, as previously mentioned, is a bi-directional transmit and receive electro-optic device that may be used to provide a physical layer interface in a fiberoptic transmission system, e.g., a OTN G.709 standard based system. Typically, a transceiver module interfaces with a "user world" through a connector interface. In a transmit direction, a transceiver module may multiplex an electrical data signal and transmit the multiplexed data signal in an optical form, for example, through a fiber. In a receive direction, the transceiver module may receive an optical signal and convert the optical signal into an electrical equivalent.

Figure 4:
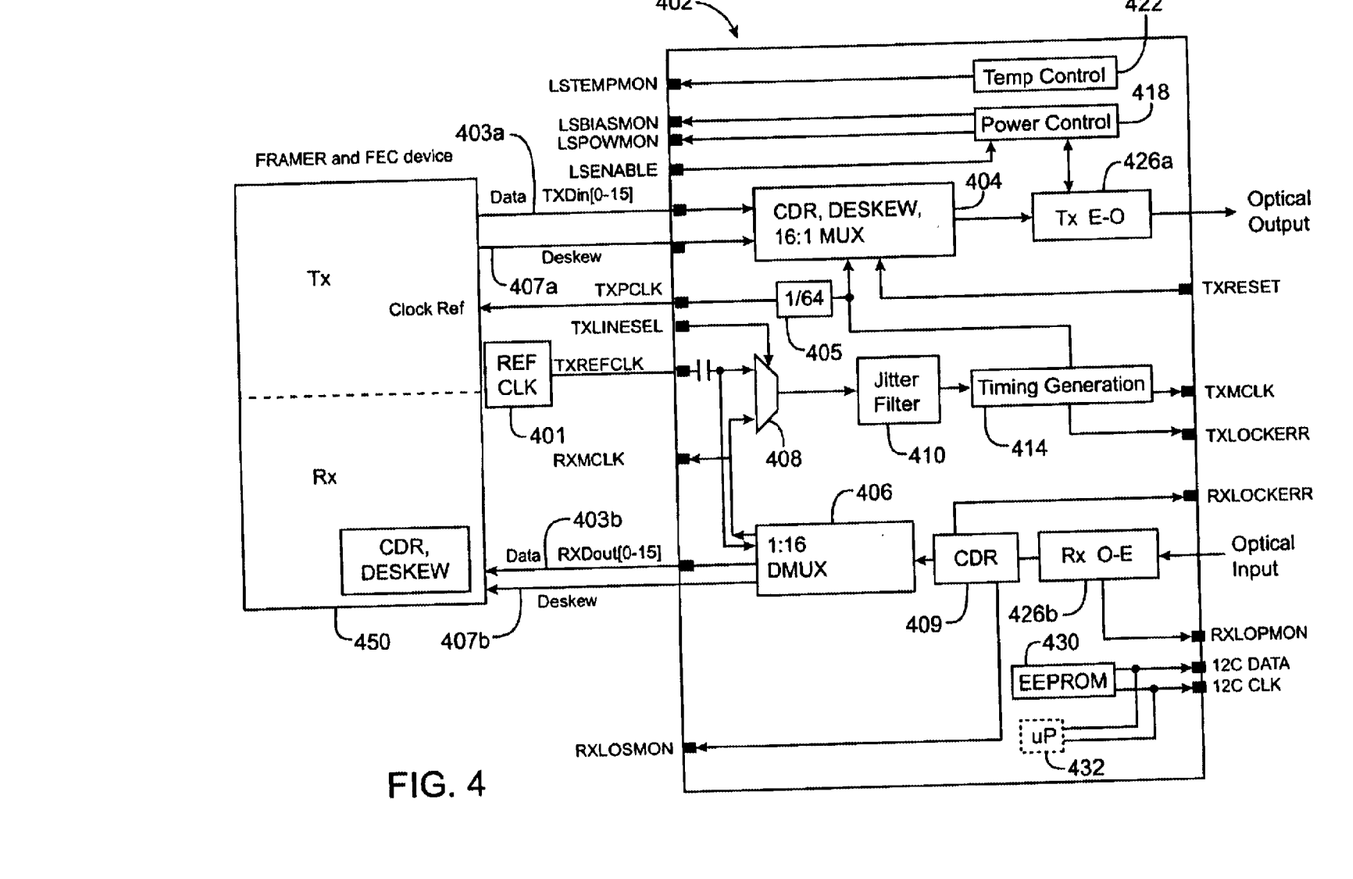
FIG. 4 is a block diagram which illustrates components included in a transceiver module in accordance with an embodiment of the present invention.

Referring next to FIG. 4, the components included in a transceiver will be described in accordance with an embodiment of the present invention. FIG. 4 is a block diagram which shows some of the components include in a transceiver 402. Transceiver 402 may include a substantially standardized optical interface, in addition to a substantially standardized electrical interface. In addition, transceiver 402 generally includes a common electrical interface connector, such as a 300 pin FCI MegArray connector.

Typically, transceiver 402 includes a multiplexer (MUX)/ clock and data recovery (CDR)/deskew building block 404 that is arranged to recover input data clock, deskew and multiplex signals provided to transceiver 402, e.g., signals from a framer in addition to or in lieu of forward error correction (FEC) device 450. To provide synchronous multiplexing, a 16:1 multiplexer in MUX/CDR/deskew building block 404 uses a reset input TXRESET. In one embodiment, with reference to the OTN G.709 standard, the signals received by transceiver 402 are 16-bit 2.69 Gbps CML, Infiniband, or XAUI electrical signals 403a. MUX/ CDR/deskew building block 404, which includes a 16:1 multiplexer, as mentioned above, multiplexes the signals received by transceiver 402 such that the signals, e.g., 16-bit 2.69 Gbps signals 403a, may be formed into an approximately 43.0 Gbps optical signal. A demultiplexer 406, e.g., a 1:16 demultiplexer (DMUX), generally converts an approximately 43.0 Gbps electrical signal into 16-bit 2.69 Gbps CML, Infiniband, or XAUI electrical signals 403b. Additional channels 407a and 407b generally provide deskew information, as for example reference frames that include four framing bytes, four bytes of expansion header, and sixteen sets of 8-byte samples of each signal associated with data channels 403a and 403b, from the framer and/or FEC device 450 to transceiver device 402, and from transceiver 402 to the framer and/or FEC device 450 respectively to substantially eliminate errors related to skew in sixteen data channels 403a and 403b.

Transceiver 402 also includes an analog multiplexer 408 that accepts a reference clock from external oscillator REFCLK 401, or an internal recovered clock from CDR 409 through 1:16 DMUX 406, and provides a single clock to a filter 410, i.e., a jitter filter, using a TXLINESEL input. Filter 410 filters an input reference clock to transceiver 402 or, more specifically, a transmitter portion of transceiver 402. Filter 410 may be a part of, or may be in communication with, a timing generation system 414 which synthesizes a transmit clock from an input clock. A divider 405 provides a parallel reference clock TXPCLK for framer and/or FEC device 450. By way of example, a clock synthesizer system may synthesize a 43.0 GigaHertz. (GHz) transmit clock from an input 672 MegaHertz (MHz) reference clock. An analog multiplexer 408 provides the selection of an external clock TXFERCLK from REFCLK 401 or an internal recovered clock from CDR 409 through 1:16 DMUX 406, using the TXLINESEL input. A timing generation system 414 provide source timing mode, using recovered clock from CDR 409 through 1:16 DMUX 406, multiplexer 408, filter 410 and line timing mode, using external reference clock TXFERCLK from CLKREF 401. 1:16 DMUX 406 provides a clock RXMCLK which may be used for monitoring purposes.

A power controller 418 is generally arranged to function as a laser power monitor (LSPOWMON) and a laser bias monitor (LSBIASMON) to monitor the output optical power of transceiver 402, e.g., electro-optical transformer 426a. As will be understood by those skilled in the art, power transmitted by transceiver 402 is generally transmitted as an analog signal. Hence, power control monitor points LSPOWMON and LSBIASMON may be analog signals. A temperature controller 422 is arranged through a laser temperature monitor (LSTEMPMON) monitor point to effectively ensure that the operational temperature of a laser in electro-optical transformer 426a falls within an acceptable range. Electro-optical transformer 426a provides an optical output signal of transceiver 402. A laser enable (LSENABLE) input is used to tune laser of electro-optical transformer 426a on or off.

Timing Generation system 414 provides a lock error indication function of the transmitter portion of transceiver 402 using a TXLOCKERR output, and a transmitter clock monitor function, using a TXMCLK output. CDR 409 provides a lock error (RXLOCKERR) monitor function and a loss of signal (RXLOSMON) monitor function of receiver portion of transceiver 402. Also included in transceiver 402 is a receiver opto-electrical transformer 426b, which provides a transformation of an input optical signal from an optical domain to an electrical domain, as well as a loss of optical power function through an RXLOPMON output. Opto-electrical transformer 426b accepts an optical input signal of transceiver 402.

Typically, transceiver 402 also includes an EEPROM 430, or a similar device, which stores data that often includes, but is not limited to, a module identifier and calibration data. Also included in transceiver 402 is microprocessor (uP) 432, which may provide status information of substantially all building blocks of transceiver 402. In one embodiment, EEPROM 430, in addition to microprocessor 432, is substantially coupled to an I1C interface which includes I2C data and I2C clock inputs and outputs.

For an application in which transceiver 402 is part of an intermediate or long range transmissions in an OTN G.709 standard-based system, transceiver 402 generally provides an optical output, e.g., an optical carrier signal, modulated by an approximately 43.0 Gbps bit stream, to an accessory module, as discussed above. Although a single accessory module may be suitable to generate acceptable intermediate range and long range transmissions, separate accessory modules may be implemented for use in intermediate and long range transmissions systems to effectively reduce the complexity of intermediate range accessory module. An optical accessory module which is suitable for use as a part of an intermediate range transmissions system will be described below with respect to FIG. 5A, while an optical accessory module which is suitable for use as a part of a long range transmission system will be described below with respect to FIG. 5B.

In general, an accessory module includes an optical postamplifier on a transmitter side, a variable optical attenuator (VOA), a tunable chromatic dispersion compensation device (DCD), a PMD compensation device (PMDC), an optical preamplifier, and an amplified spontaneous emission (ASE) filter on a receiver side.

Figure 5A:
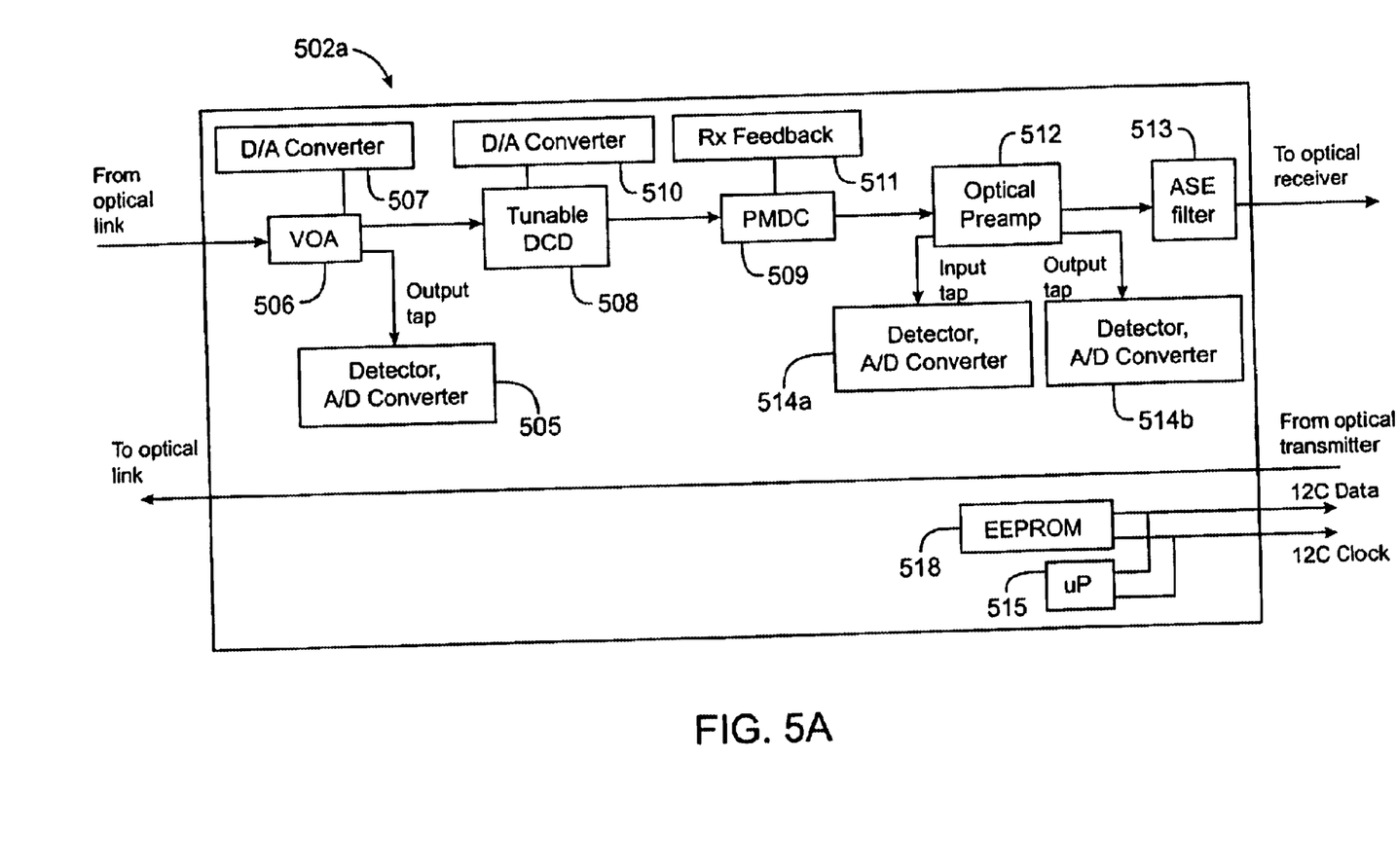
FIG. 5A is a block diagram which illustrates components included in a first accessory module in accordance with an embodiment of the present invention.

FIG. 5A is a block diagram representation of an optical accessory module which. supports intermediate range transmissions in accordance with an embodiment of the present invention. An optical accessory module 502a is arranged to receive input from an optical link and/or an optical transmitter, and to transmit output to an optical link and/or an optical receiver. Generally, the optical link is a fiber over which communications between accessory module 502a and another accessory module may occur, for instance. The optical receiver and the optical transmitter are generally a part of a transceiver, as for example transceiver 402 of FIG. 4.

Input from an optical link, which is received on a VOA 506 that provides attenuation of the input optical signal, and forwards the attenuated optical signal to a tunable DCD 508. The variable attenuator is arranged to bring the input optical signal power down to a known level, such that the length of the fiber over which the signal was received is rendered to be effectively irrelevant.

VOA 506 operates with a digital to analog (D/A) converter 507 to provide variable attenuation. The attenuated optical signal, i.e., the output signal from VOA 506, may be monitored by a first detector and analog to digital (A/D) converter 507. Tunable DCD 508, which operates with D/A converter 510, may be tuned to compensate for the chromatic dispersion of the optical link. The output of tunable DCD 508 is provided to PMDC 509 which is arranged to compensate for the DGD of the optical link. High-speed receiver feedback 511 is arranged to provide dynamic DGC compensation. The output of PMDC 509 is provided to an optical preamplifier 512 which is arranged to compensate for losses of the optical link, as will be understood by those skilled in the art.

Input signal monitoring on the input signal to optical preamplifier 512 is provided by a second detector and A/D converter 514a. That is, second detector and A/D converter 514a provides an input power monitor tap with respect to optical preamplifier 512. Similarly, output signal monitoring on the output signal from optical preamplifier 512 is provided through the use of a third detector and A/D converter 514b, which provides an output power monitor tap on the output from optical preamplifier 512. The output of optical preamplifier 512 is fed into an ASE filter 513, or ASE suppression filter, that provides noise filtering, i.e., optical noise filtering, for signals which are to be passed to the optical receiver, e.g., an optical receiver of transceiver 402.

Accessory module 502a receives an input from an optical transmitter portion of a transceiver and substantially directly provides an output to an optical link, generally without any processing. Accessory module 502a may also include an EEPROM 518 and a microprocessor 519 with an I2C interface. EEPROM 518 generally stores calibrated data and other information including, but not limited to, a module identifier for accessory module 502a. Microprocessor 519 provides status information for substantially all A/D and D/A converters of the building blocks of accessory module 502a using the I2C interface.

As previously mentioned, accessory module 502a may be suitable for use in an intermediate range transmissions application. For long range transmissions, PMD and CD will often be a more significant problem. In other words, for a long range transmissions system, additional components and circuitry may be needed in an accessory module to compensate for PMD and CD which is often associated with long range transmissions.

Figure 5B:
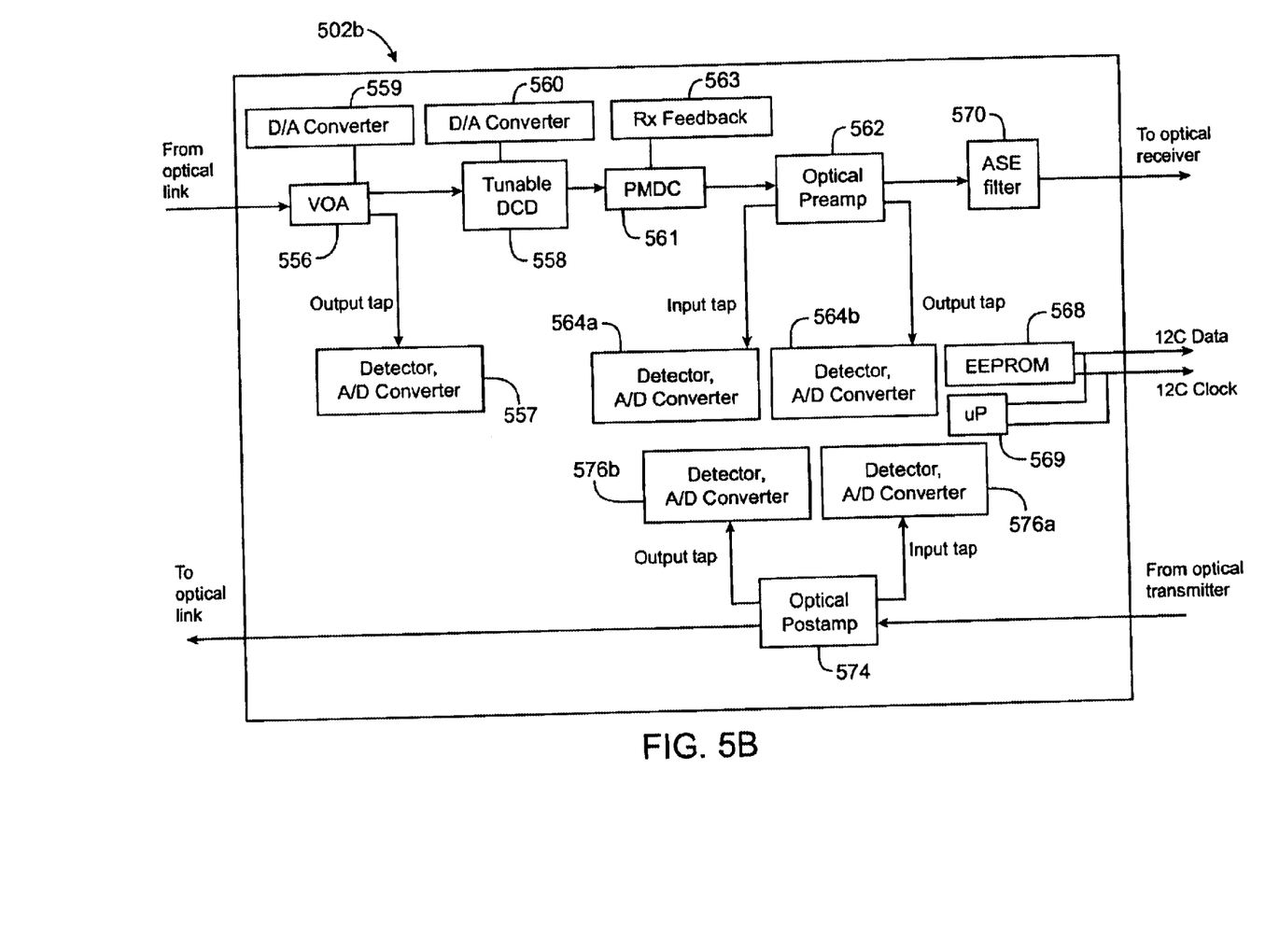
FIG. 5B is a block diagram which illustrates components included in a second accessory module in accordance with an embodiment of the present invention.

FIG. 5B is a block diagram representation of an optical accessory module which is suitable for use in a relatively long range transmission system in accordance with an embodiment of the present invention. An accessory module 502b includes a VOA 556 which takes an optical signal from an optical link, e.g., a fiber, as an input. VOA 556 operates with a D/A converter 559 to provide a required attenuation range. In a long range transmission system, while the strength of the input signal to VOA 556 may vary, the range of the input signal most often depends on the power budget of the optical link, the required optical signal to noise ratio, and receiver sensitivity. VOA 556 provides attenuation for the input signal. In other words, the output signal from VOA 556 is essentially an attenuated version of the input signal. A first detector and A/D converter 557 provides a tap on the output optical power of VOA 556 and monitors the output optical power of VOA 556.

The output of VOA 556 is provided to a tunable DCD 558 which, in cooperation with a D/A converter 560, is arranged to compensate for CD associated with the optical link. Output from DCD 558 is fed to a PMDC 561 that operates with high-speed feedback 563 from a receiver, e.g., to receiver portion of transceiver 402 to provide dynamic DGD compensation. Output from PMDC 561 is fed to an optical preamplifier 562 that operates to compensate for signal losses associated with the optical link. A second detector and A/D converter 564a and a third detector and A/D converter 564b serve to monitor the input to optical preamplifier 562 and the output of optical preamplifier 562, respectively. The output of optical preamplifier 562 is fed into an ASE filter 570, or an ASE suppression filter, that provides noise filtering, i.e., optical noise filtering, for signals which are to be passed to an optical receiver.

When a signal is transmitted from an optical transmitter, the signal is amplified by optical postamplifier 574 of accessory module 502b. A fourth detector and A/ID converter 576a provides an input tap to optical postamplifier 574 to monitor the input optical power to optical postamplifier 574. A fifth detector and A/D converter 576b provides an output tap to optical postamplifier 574, and monitors the output optical power from optical postamplifier 574. The output optical signal of optical postamplifier 574 is an input optical signal to the optical link.

Like accessory module 502a of FIG. 5A, accessory module 502b typically includes an EEPROM 568, or a similar device, and a microprocessor 569. EEPROM 568 is generally arranged to store information associated with the operation of accessory module 502b. Microprocessor 569 provides status information for substantially all A/D and D/A converters of the building blocks of accessory module 502b. In general, accessory module 502b has an I2C input interface and an I2C output interface for substantially all monitoring and control ports. It should be-understood, however, that the 12C interfaces are just one example of suitable interfaces for accessory module 502b.

When a module is used as a part of a line card such as-a line card associated with an optical transport platform such as the ONS 15454 available from Cisco Systems, Inc., the thermal properties of the module may affect the operation of the line card, as well as the operation of other components and line cards which operate in proximity to the module. As such, heat sinks are often used to essentially dissipate heat generated by the line card and, hence, improve the thermal properties of the line card. In one embodiment, while a heat sink may be positioned over an entire line card such as line card 302 of FIGS. 3A and 3B, a transceiver module, which may be dropped into place on a line card, may have its own dedicated heat sink. That is, a transceiver module may effectively be mostly encased within a heat sink such that substantially only external connections are unshielded by the heat sink. The encasing of a transceiver module in a dedicated heat sink provides the transceiver module with heat dissipating capabilities, and also facilitates the swapability of the transceiver module.

Referring next to FIGS. 6A and 6B, the physical structure of a transceiver module will be described in accordance with embodiments of the present invention. While a transceiver module may generally have substantially any suitable form, a transceiver module is most often either physically configured to fit into a line card or to be implemented as an overall component in a router. FIG. 6A is a diagrammatic cross-sectional representation of a transceiver module which is suitable for use as a part of a line card, while FIG. 6B is a diagrammatic cross-sectional representation of a transceiver module which is included on a line card of a router. It should be appreciated that a transceiver module which is suitable for use with respect to a router may be used in some cases as a part of a line card associated with the router. For ease of illustration, not all features of the transceiver modules of FIGS. 6A and 6B have been shown.

A module which may be used as a part of a line card in, for example, the ONS 15454 available from Cisco Systems, Inc., may differ from a module which may be used as a part of a router in that the external interfaces of the modules may differ. In addition, various specifications for the modules may also vary. By way of example, the airflow specifications associated with the modules may be such that the minimum operating airflow of one module may be greater than the minimum operating airflow for the other module. Also, a module which is to be used as a part of a line card may have higher heat and/or power dissipation issues, e.g., may need more cooling, than a module which is not used as a part of a line card, since a module which is used as a part of a line card may operate in close proximity to other line cards. As shown in FIG. 6A, a module 602 which may operate within a line card includes a PC board 606, as well as a heat sink covering 610. In one embodiment, PC board 606 includes a multi-layered Alumina substrate that provides substantially all connections between a transmit submodule and a receive submodule which are associated with module 602. A connector 608, which may be substantially any suitable connector including, but not limited to, a 300 pin MegArray connector, is coupled to PC board 606 and provides an interface for an external connection to module 602. PC board 606 is substantially sealed within an enclosure 610, e.g., an aluminum enclosure, which includes a heat sink fin structure. The heat sink fin structure may include a pattern that is substantially optimized to provide for a high level of power dissipation capability. As shown, connector 608 is not sealed within enclosure 610, as connector 608 is arranged to be connected to an external device. Typically, high frequency interconnects may be made within enclosure 610 to substantially minimize through losses and reflections.

The size of module 602 may vary widely depending upon the requirements of an overall system which uses module 602. Preferably, the size of module 602 is substantially minimized. By way of example, the width of module 602 may be up to approximately 4.3 inches, the length of module 602 may be up to approximately 5.5 inches, and the height of module 602, may be up to approximately 0.76 inches.

Module 602 also includes at least two fiber pigtails 612, as for example a receiver pigtail and a transmitter pigtail. Fiber pigtails 612 are arranged to interface with a fiber or fibers over which signals may be transmitted. The material from which fiber pigtails 612 are formed, as well as the physical dimensions of fiber pigtails 612, may vary. One suitable fiber pigtail 612 may be formed from a singlemode 9/125/900 fiber which is protected by a mechanically robust jacket, and may have a length of between approximately 0.9 meters to approximately 1.1 meters.

FIG. 6B is a diagrammatic cross-sectional representation of a transceiver module which is suitable for use as a part of a router line card in accordance with an embodiment of the present invention. A module 652 is generally designed to be mountable onto a motherboard faceplate, for example, in either a vertical or horizontal orientation. Hence, any heatsink fins on module 652 are arranged to be effective in cooling module 652 in either a horizontal or vertical orientation. In lieu of including heatsink fins, i.e., which are effective in cooling module 652 in either a horizontal or vertical orientation, as a part of module 652, an external heatsink which is coupled to module 652 may be used to cool module 652.

Module 652 includes a PC board 656 which includes transmitting and receiving circuitry. A connector 658, such as a 300 pin MegArray connector, is coupled to PC board 656 and allows module 652 to be coupled, for example, to a line card associated with a router. An enclosure 660, which typically includes a substantially bolted on heat sink fin structure, is arranged to encompass a substantial amount of PC board 656. Enclosure 660 protects PC board 656 and, when enclosure 660 includes heat sink fins, also provides a cooling mechanism for module 652. Module 652 may include at least one output cable 664 through which data signals may be transmitted.

Like the size of module 602 of FIG. 6A, the size of module 652 may vary widely as required by an overall system in which module 652 is included. In one embodiment, in order to provide a relatively small footprint for module 652, while still enabling module 652 to include necessary circuitry, the width of module 652 may be up to approximately 3.5 inches, the length of module 652 may be up to approximately 6.4 inches, and the height of module 602, may be up to approximately 0.53 inches.

Figure 7A:
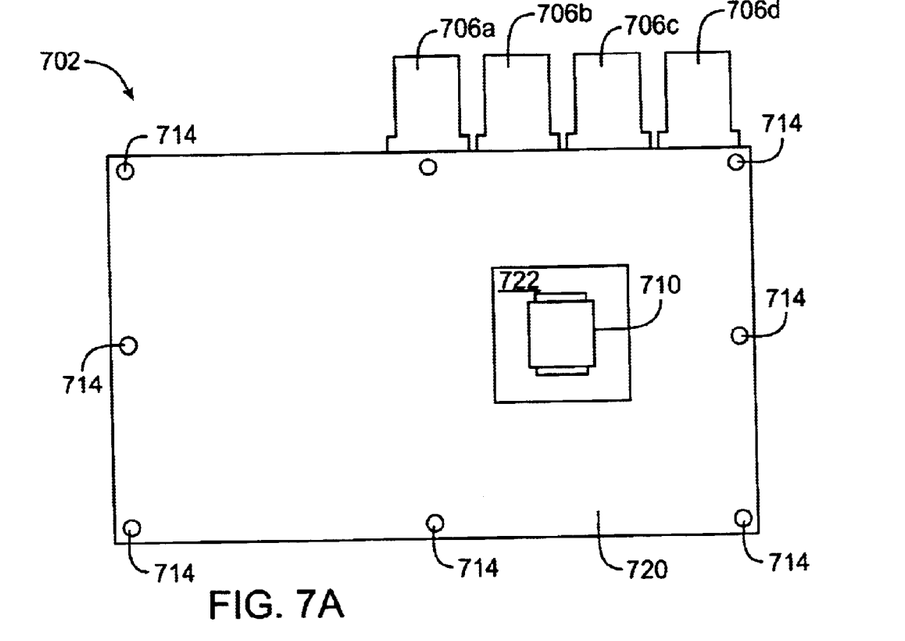
FIG. 7A is a diagrammatic bottom view representation of an accessory module in accordance with an embodiment of the present invention.
Figure 7B:
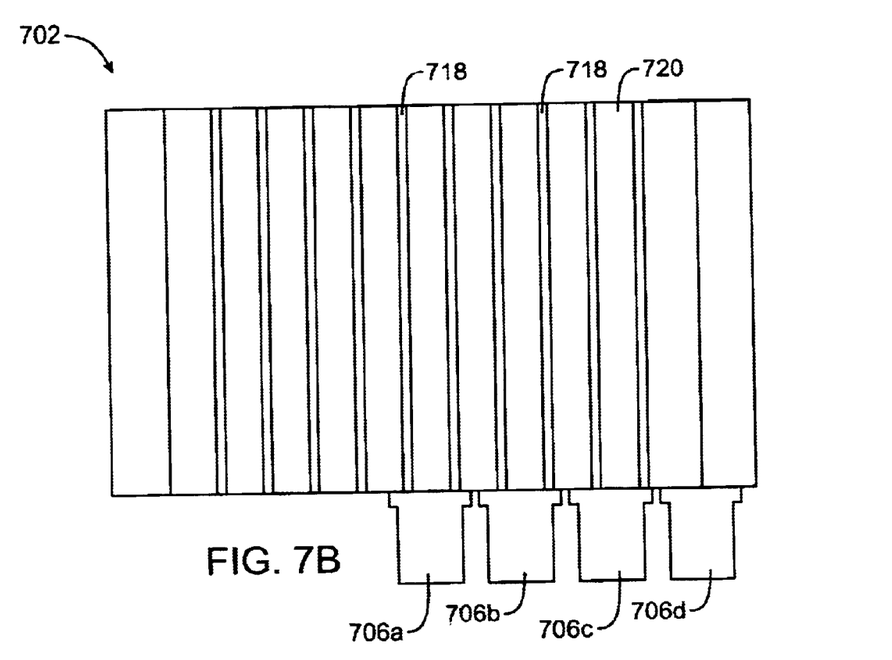
FIG. 7B is a diagrammatic top view representation of an accessory module, i.e., accessory module 702 of FIG. 7A, in accordance with an embodiment of the present invention.

In general, in addition to transceiver modules which may vary in design, accessory modules may also vary in design. With reference to FIGS. 7A and 7B, one suitable design of an optical accessory module will be described in accordance with an embodiment of the present invention. FIG. 7A is a diagrammatic bottom view representation of an accessory module, while FIG. 7B is a diagrammatic top view representation of the same accessory module. An accessory module 702 includes receptacles 706, e.g., simplex LC receptacles, which are optical connectors. In one embodiment, receptacle 706a is arranged to provide a signal to a front panel associated with a PC board assembly, receptacle 706b is arranged to receive a transmission signal from a transmitter on a transceiver, receptacle 706c is arranged to receive a signal from the front panel, and receptacle 706d is arranged to send a signal to a receiver on a transceiver.

Accessory module 702 also includes a connector 710, such as a 100 pin MegArray connector. Connector 710 is used to enable accessory module 702 to mate or communicably attach to a PC board assembly. Holes 714 are sized to accommodate fasteners, e.g., screws or bolts, which allow accessory module to be physically secured to a PC board assembly, or a holding device.

In order to provide cooling to accessory module 702, heat sink fins 718 may be positioned on accessory module 702. Specifically, in one embodiment, heat sink fins 718 are positioned on a top side of accessory module 702. As will be understood by those skilled in the art, heat sink fins 718 are generally formed or attached to a casing 720 which protects a PC board associated with accessory module 702. Casing 720, which may be formed from a material such as aluminum, includes an opening 722 through which access to connector 710 may be made, and also enables receptacles 706 to provide access to the internal PC board.

Accessory module 702 may have substantially any dimensions, depending at least in part upon the required footprint for a given application. In one embodiment, accessory module 702 preferably has a width of up to approximately 2.25 inches, a length of up to approximately 4 inches, and a height of up to approximately 0.53 inches. It should be appreciated, however, that the size of accessory module 702 may vary widely depending upon the requirements of a particular system.

Although only a few embodiments of the present invention have been described, it should be understood that the present invention may be embodied in many other specific forms without departing from the spirit or the scope of the present invention. By way of example, the components in a transceiver or an accessory module may vary. Components may generally be altered, removed, and added as required. For instance, for a mode in which a transceiver will not need a source timing mode, a timing generator 403 which provides a reference clock signal for a source timing mode may effectively be eliminated.

Components and circuitry within modules has been described as including components and circuitry for reducing the effects of polarization mode dispersion and chromatic dispersion. While specific components have been described, such as a PMDC device included in an accessory module for reducing the effects of PMD, it should be understood that the components and circuitry used to reduce the effects of PMD and CD may vary.

As described above, a transceiver module typically includes substantially only the components and circuitry needed to support short range transmissions of information. However, it should be appreciated that in some cases, a transceiver module may include components which are arranged to support more than short range transmissions of information. That is, there may be one type of base transceiver module which supports substantially only short range transmissions, and another type of base transceiver module which serves as a base for intermediate range and long range transmissions without departing from the spirit or the scope of the present invention.

While a transceiver module and an accessory module have been described as being suitable for the implementation of SONET, SDH, and OTN standards for an OC-192 level, an STM-64 level, and an OTU-2 level, respectively, and an OC-768 level, an STM-256 level, and an OTU-3 level, respectively, a transceiver and an accessory module may generally be suitable for use with substantially any SONET, SDH, or OTN level. The standards may include slower speeds, e.g., an OC-48 level, an STM-16 level, and a OTU-1 level, and faster bit rates. Further, a modular transceiver and accessory module implementation may also be used in any suitable network in which expandability and relatively easy swapping of accessory modules, as well as transceivers, is desired.

A single accessory module has generally been described as being suitable for augmenting the performance of a transceiver module. By way of example, an accessory module has been described as being suitable for either increasing a short transmissions range associated with a transceiver module to either an intermediate transmissions range or a long transmissions range. In one embodiment, more than one accessory module may be used to essentially improve the performance of a transceiver module. For instance, a first accessory module may provide for an intermediate transmissions range, and another accessory module, which may be added in series with the first accessory module, may add the functionality needed to provide for a longer transmissions ranges.

In general, any suitable mechanism or method may be used to secure a module to a line card or other device. Typically, screws, bolts, and the like may be used to effectively couple a module to a line card. It should be appreciated, however, that the securing devices used to couple a module to a line card may vary widely. Further, the number and location of securing devices used to couple a module to a line card may also vary, depending upon factors which include, but are not limited to, the size of the module, the weight of the module, the configuration of the module, and the strength of the securing devices.

A transceiver module has generally been described as being substantially directly in communication with any transceiver over a fiber in a system in which there are no accessory modules. Within a system in which accessory modules are used to effectively boost the transmissions range of transceiver modules, the transceiver modules are typically in communication through the accessory modules and across a fiber. In one embodiment, in a system that includes accessory modules, transceiver modules may be arranged to bypass the accessory modules. For example, within a system that includes accessory modules to provide for intermediate range transmissions, transceiver modules may communicate without using the accessory modules when short range transmissions are desired. Therefore, the present examples are to be considered as illustrative and not restrictive, and the invention is not to be limited to the details given herein, but may be modified within the scope of the appended claims.

What is claimed is:

1. An optical network system comprising:
   a first device, the first device being coupled to a fiber; and
   a second device, the second device being coupled to the fiber, the second device being in communication with the first device through the fiber, the second device including a first modular subsystem, the first modular subsystem being arranged to transmit and to receive data through the fiber, the first modular subsystem further being arranged to process optical data and electrical data, the first modular subsystem having a first transmissions range, the first modular subsystem including a transceiver module that supports the first transmissions range, the first modular subsystem being arranged to include an accessory module which substantially improves on the first transmissions range, wherein the first modular subsystem is substantially physically decoupleable from the second device and from the fiber.

2. An optical network system as recited in claim 1 wherein the first transmissions range is a short range transmissions range.

3. An optical network system as recited in claim 2 wherein the first modular subsystem also includes the accessory module, the accessory module being arranged to substantially improve on the first transmissions range supported by the transceiver module.

4. An optical network system as recited in claim 2 wherein the accessory module and the transceiver module are arranged to cooperate to support a second transmissions range, the second transmissions range being an intermediate transmissions range.

5. An optical network system as recited in claim 2 wherein the accessory module and the transceiver module are arranged to cooperate to support a second transmissions range, the second transmissions range being a long reach transmissions range.

6. An optical network system as recited in claim 3 wherein the accessory module and the transceiver module are decoupleable.

7. An optical network system as recited in claim 2 wherein the first device includes a second modular subsystem, the second modular subsystem being arranged to transmit and to receive data through the fiber, wherein the second modular subsystem is substantially physically decoupleable from the first device and from the fiber.

8. An optical network system as recited in claim 7 wherein the second modular subsystem is in communication with the first modular subsystem through the fiber.

9. An optical network system as recited in claim 1 wherein the first modular subsystem is arranged to transmit and to receive optical signals through the fiber, the first modular subsystem further being arranged to provide electrical signals to the second device and to receive electrical signals from the second device.

10. An optical network system as recited in claim 1 wherein the first modular subsystem is arranged to support one optical carrier level selected from the group consisting of an OC-48, an STM-16 level, an OTU-1 level, an OC-192 level, an STM-64 level, an OTU-2 level, an OC-768 level, an STM-256 level, and an OTU-3 level.

11. A device, the device being suitable for use as a part of a network, the network including at least one transmission fiber, the device comprising:
   a body, the body including a first connector means; and
   a first module, the first module being decoupleable from the body, the first module having a first transmissions range, the first module including a receiver means for receiving optical data and a transmitter means for transmitting optical data, the first module further including a second connector means and a first connection means, the first connection means being arranged to be coupled with the transmission fiber, the second connector means being arranged to be coupled with the first connector means, wherein when the first module is coupled to the body through the first connector means and the second connector means, the first module is arranged to communicate with the body, and wherein the first module is arranged to be substantially coupled to a second module which is arranged to substantially improve on the first transmissions range, wherein substantially improving on the first transmissions range includes enabling the first module and the second module to cooperate to support at least a second transmissions range.

12. A device as recited in claim 11 wherein when the first connection means is coupled with the transmission fiber, the first module is arranged to receive data from the body and to process the data before sending the processed data through the first connection means to the transmission fiber.

13. A device as recited in claim 11 wherein when the first connection means is coupled with the transmission fiber, the first module is arranged to receive data through the first connection means from the transmission fiber and to process the data before sending the processed data through the second connector means to the body.

14. A device, the device being suitable for use as a part of a network, the network including at least one transmission fiber, the device comprising:
   a body, the body including a first connector means;
   a first module, the first module being decoupleable from the body, the first module including a receiver means for receiving optical data and a transmitter means for transmitting optical data, the first module further including a second connector means and a first connection means, the first connection means being arranged to be coupled with the transmission fiber, the second connector means being arranged to be coupled with the first connector means, wherein when the first module is coupled to the body through the first connector means and the second connector means, the first module is arranged to communicate with the body, wherein the first module is arranged to support a first transmissions range; and
   a second module that is arranged to substantially improve on the first transmissions range, the second module being arranged to interface with the first module through the body, wherein the second module is decoupleable from the body.

15. A device as recited in claim 11 wherein the first module is substantially protected by a heat sink means, the heat sink means being a part of the first module.

16. A device, the device being suitable for use as a part of a network, the network including at least one transmission fiber, the device comprising:

a body, the body including a first connector part; and a first module, the first module being decoupleable from the body, the first module including a receiver for receiving optical data and a transmitter for transmitting optical data, the first module further including a second connector part and a first connection, the first connection being arranged to be coupled with the transmission fiber, the second connector part being arranged to be coupled with the first connector part, wherein when the first module is coupled to the body through the first connector part and the second connector part, the first module being arranged to communicate with the body and to support a first transmissions range, the first module further being arranged to be used to support a second transmissions range, the second transmissions range being greater than the first transmissions range.

17. A device as recited in claim 16 wherein when the first connection is coupled with the transmission fiber, the first module is arranged to receive data from the body and to process the data before sending the processed data through the first connection to the transmission fiber.

18. A device as recited in claim 16 wherein when the first connection is coupled with the transmission fiber, the first module is arranged to receive data through the first connection from the transmission fiber and to process the data before sending the processed data through the second connector part to the body.

19. A device, the device being suitable for use as a part of a network, the network including at least one transmission fiber, the device comprising:

a body, the body including a first connector part;

a first module, the first module being decoupleable from the body, the first module including a receiver for receiving optical data and a transmitter for transmitting optical data, the first module further including a second connector part and a first connection, the first connection being arranged to be coupled with the transmission fiber, the second connector part being arranged to be coupled with the first connector part, wherein when the first module is coupled to the body through the first connector part and the second connector part, the first module is arranged to communicate with the body, wherein the first module is arranged to support a first transmissions range; and a second module that is arranged to substantially improve on the first transmissions range, the second module being arranged to interface with the first module through the body, wherein the second module is decoupleable from the body.

20. A device as recited in claim 19 wherein the second module is arranged to augment the first transmissions range to support a second transmissions range, the second transmissions range being substantially larger than the first transmissions range.

21. A device, the device being suitable for use on a network, the device comprising:

a body;

a transceiver module, the transceiver module being arranged to be removably coupled to the body, the transceiver module further being arranged to transmit and to receive data through the network, the transceiver module still further being arranged to transmit and to receive data through the body, wherein the transceiver module supports relatively short range transmissions; and an accessory module, the accessory module being arranged to be removably coupled to the body, the accessory module further being arranged to transmit and to receive data through both the network and the transceiver module, wherein the accessory module cooperates with the transceiver module to support at least intermediate range transmissions.

22. A device as recited in claim 21 wherein the accessory module is communicably coupled to the transceiver module through the body.

23. A device as recited in claim 21 wherein accessory module is substantially directly physically coupled to the transceiver module.

24. A device as recited in claim 21 wherein the accessory module cooperates with the transceiver module to support relatively long range transmissions.

* * * * *